United States Patent
Quintero et al.

(10) Patent No.: US 7,443,312 B2
(45) Date of Patent: Oct. 28, 2008

(54) DOWNHOLE TELEMETRY SYSTEM HAVING DISCRETE MULTI-TONE MODULATION WITH QAM FALLBACK

(75) Inventors: Alberto Quintero, Katy, TX (US); Carl Dodge, Houston, TX (US); Homi P. Cooper, Houston, TX (US); Wallace R. Gardner, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 415 days.

(21) Appl. No.: 10/863,131

(22) Filed: Jun. 8, 2004

(65) Prior Publication Data

US 2005/0270171 A1      Dec. 8, 2005

(51) Int. Cl.
*G01V 3/00*       (2006.01)
(52) U.S. Cl. .............. 340/853.1; 340/855.1; 340/855.3; 340/855.8
(58) Field of Classification Search .............. 340/853.1, 340/855.1, 855.3, 855.8
See application file for complete search history.

(56) References Cited

U.S. PATENT DOCUMENTS

| | | | | |
|---|---|---|---|---|
| 5,940,438 | A * | 8/1999 | Poon et al. | 375/222 |
| 6,192,070 | B1 * | 2/2001 | Poon et al. | 375/222 |
| 6,469,636 | B1 | 10/2002 | Baird et al. | |
| 6,671,328 | B1 * | 12/2003 | Poon et al. | 375/295 |
| 6,747,569 | B2 * | 6/2004 | Hill et al. | 340/855.8 |
| 7,026,952 | B2 * | 4/2006 | Krueger | 340/855.3 |
| 2002/0140572 | A1 * | 10/2002 | Gardner et al. | 340/853.3 |
| 2003/0011489 | A1 * | 1/2003 | Viswanathan | 340/853.1 |
| 2004/0156264 | A1 * | 8/2004 | Gardner et al. | 367/81 |
| 2005/0104743 | A1 * | 5/2005 | Ripolone et al. | 340/855.1 |

FOREIGN PATENT DOCUMENTS

WO         WO 01/49001  A1      5/2001

OTHER PUBLICATIONS

DMT definition provided by Wikipedia.*
3AM systems modem modulation for V.xx, www.3amsystems.com/wireline/hmo.htm.*
Handshaking definition by Wikipedia.*
Modulation definition Wikipedia.*

* cited by examiner

*Primary Examiner*—Albert K Wong
(74) *Attorney, Agent, or Firm*—Krueger Iselin LLP; Daniel J. Krueger

(57) ABSTRACT

Improved communication systems and methods are disclosed. In one embodiment, a downhole communications system comprises a downhole transceiver and a surface transceiver. The surface transceiver receives a discrete multi-tone (DMT) modulated uplink signal from the downhole transceiver, and transmits a downlink signal to the downhole transceiver using a modulation method determined by the transceivers as communications are initiated. The downlink modulation methods supported by the surface transceiver may include DMT modulation and quadrature amplitude modulation (QAM). The modulation mode selection may be based on measured channel characteristics, on proposed data rates, or on other predetermined parameters. The uplink and downlink signals may be communicated over a shared transmission mode on multiconductor cable or wired pipe, and alternatively the uplink and downlink signals may be communicated over separate transmission modes.

15 Claims, 6 Drawing Sheets

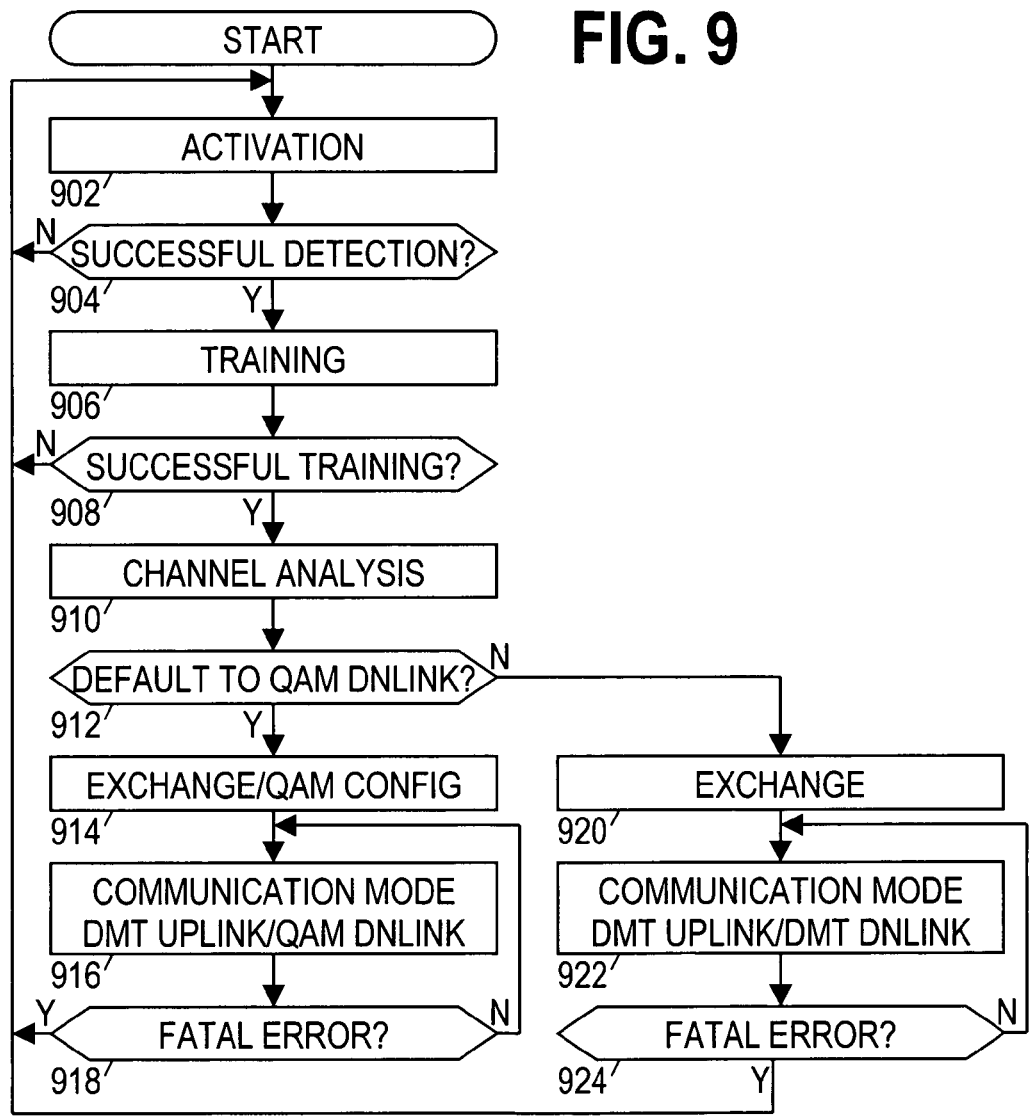

DOWNHOLE TELEMETRY SYSTEM HAVING DISCRETE MULTI-TONE MODULATION WITH QAM FALLBACK

BACKGROUND

Modern petroleum drilling and production operations demand a great quantity of information relating to parameters and conditions downhole. Such information typically includes earth formation characteristics and borehole configuration data. The methods that can be used to collect information downhole include: wireline logging, logging-while-drilling ("LWD"), and seismic imaging. After a well has been completed, downhole data collection may be performed by permanently emplaced sensors, by wireline logging, and by seismic monitoring.

In conventional wireline logging, a probe ("sonde") containing formation sensors is lowered into the borehole after some or all of the well has been drilled. The sonde's upper end is attached to a conductive wireline that suspends the sonde in the borehole. The conductive wireline transports power from the surface to the sonde's instrumentation, and transports information from the sonde's instrumentation to the surface.

In LWD, as the name suggests, data may be collected during the drilling process. Collecting and processing data during the drilling process eliminates the need to remove the drilling assembly to insert a wireline logging tool. LWD consequently provides the driller with better control, allowing performance optimization and minimizing downtime. Designs for measuring downhole conditions relating to the drilling assembly's movement and location have become known as "measurement-while-drilling" techniques, or "MWD". LWD generally concentrates more on the measurement of formation parameters, but the terms MWD and LWD often are used interchangeably. For the purposes of this disclosure, the term LWD will be used with the understanding that this term encompasses both the collection of formation parameters and the collection of information relating to the movement and position of the drilling assembly.

In LWD, the logging instrumentation is typically located at the lower end of the drill string. The instrumentation may operate, continuously or intermittently, to monitor predetermined drilling parameters and formation data. Some form of telemetry is then used to transmit the information to a surface receiver. Various telemetry systems exist, including mud pulse systems and systems that transmit acoustic signals through the drill string.

In seismic imaging, seismic waves are transmitted through earth formations and reflected from various boundaries and discontinuities. Seismic imaging involves stringing hundreds of listening devices on the surface or in a wellbore near a location where an understanding of the underground formations is desired. Once the listening devices have been placed, a disturbance is created to generate seismic waves. As these waves travel through the formations and encounter strata boundaries, some wave energy reflects back to the surface. With the appropriate processing of the received signals, a three-dimensional representation of the subsurface formations can be constructed.

The foregoing data collection methods are primarily used to locate and tap hydrocarbon reservoirs. Once a reservoir has been tapped, the goal becomes removing as much of the hydrocarbons from the reservoir as possible. Sensors may be emplaced in the wellbore to monitor pressure, temperature, fluid composition and inflow volumes. Wireline tools may be used to search for previously missed completion opportunities. Finally, long-term seismic monitoring may be employed to identify fluid migration patterns in and around the reservoir.

Information is the key to being profitable in the oil and gas industry. The more information one has regarding location and migration patterns of hydrocarbons within a hydrocarbon reservoir, the more likely it is that that reservoir can be tapped at its optimal location and utilized to its full potential. To this end, new and more sophisticated sensor arrangements are routinely created and placed downhole (e.g., in the wireline sonde), so much so that existing telemetry techniques are becoming inadequate. For these reasons it would be desirable to have a communication technique that can support high speed communications between downhole sensors and a surface installation.

SUMMARY

Accordingly, there is disclosed herein improved communication systems and methods. In one embodiment, a downhole communications system comprises a downhole transceiver and a surface transceiver. The surface transceiver receives a discrete multi-tone (DMT) modulated uplink signal from the downhole transceiver, and transmits a downlink signal to the downhole transceiver using a modulation method determined by the transceivers as communications are initiated. The downlink modulation methods supported by the surface transceiver may include DMT modulation and quadrature amplitude modulation (QAM). The modulation mode selection may be based on measured channel characteristics, on proposed data rates, or on other predetermined parameters. The uplink and downlink signals may be communicated over a shared transmission mode on multiconductor cable or wired pipe, and alternatively the uplink and downlink signals may be communicated over separate transmission modes.

BRIEF DESCRIPTION OF THE DRAWINGS

For a detailed description of the preferred embodiments of the invention, reference will now be made to the accompanying drawings in which:

FIG. 9 shows an illustrative communications channel initialization method.

Figure 1:
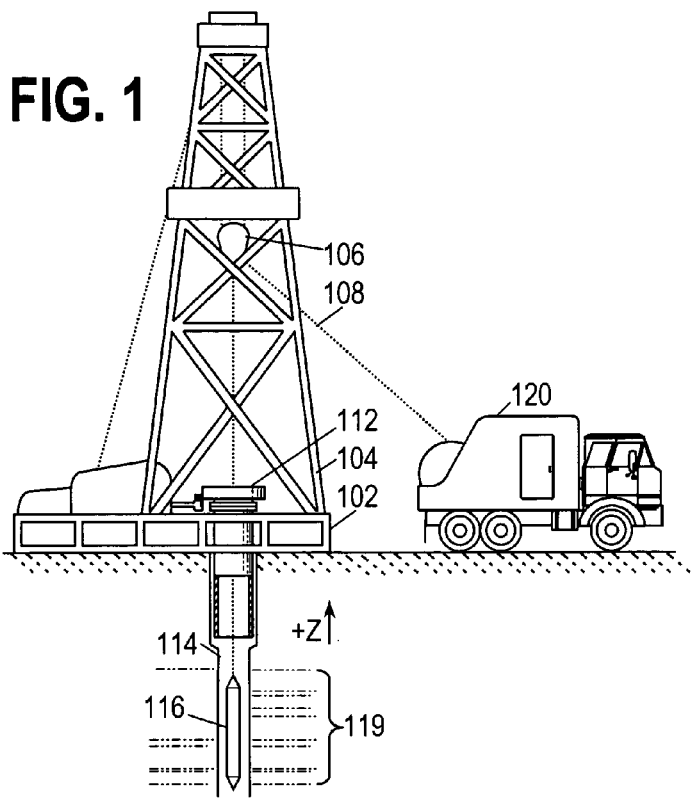
FIG. 1 shows an illustrative logging operation.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

NOTATION AND NOMENCLATURE

Certain terms are used throughout the following description and claims to refer to particular system components. As one skilled in the art will appreciate, companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ". Also, the term "couple" or "couples" is intended to mean either an indirect or direct electrical connection. Thus, if a first device couples to a second device, that connection may be through a direct electrical connection, or through an indirect electrical connection via other devices and connections. The terms upstream and downstream refer generally, in the context of this disclosure, to the transmission of information from subsurface equipment to surface equipment, and from surface equipment to subsurface equipment, respectively. Additionally, the terms surface and subsurface are relative terms. The fact that a particular piece of hardware is described as being on the surface does not necessarily mean it must be physically above the surface of the Earth; but rather, describes only the relative location of the surface and subsurface pieces of equipment.

DETAILED DESCRIPTION

Turning now to the figures, FIG. 1 shows a well during wireline logging operations. A drilling platform 102 is equipped with a derrick 104 that supports a hoist 106. Drilling of oil and gas wells is commonly carried out by a string of drill pipes connected together so as to form a drilling string that is lowered through a rotary table 112 into a wellbore 114. In FIG. 1, it is assumed that the drilling string has been temporarily removed from the wellbore 114 to allow a sonde 116 to be lowered by wireline 108 into the wellbore 114. Typically, the sonde 116 is lowered to the bottom of the region of interest and subsequently pulled upward at a constant speed. During the upward trip, the sonde 116 performs measurements on the formations 119 adjacent to the wellbore as they pass by. The measurement data is communicated to a logging facility 120 for storage, processing, and analysis. The sonde and the logging facility 120 preferably employ telemetry transmitters and receivers having discrete multi-tone (DMT) modulation with a quadrature amplitude modulation (QAM) fallback.

It is noted that the following telemetry system discussion will be presented in the context of a wireline system. However, it is recognized that this telemetry system may also be used for LWD, seismic imaging and monitoring with downhole sensors, and downhole sensors for production monitoring and control. Accordingly, the claims are not limited the wireline system context.

Figure 2A:
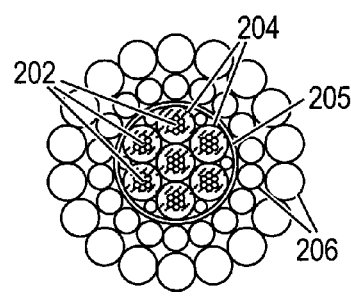
FIGS. 2A and 2B show a cross-section of a seven-conductor wireline cable.
Figure 2B:
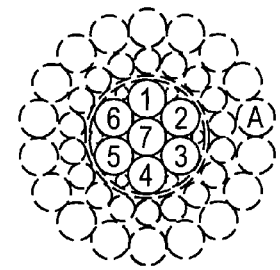
Figure 3:
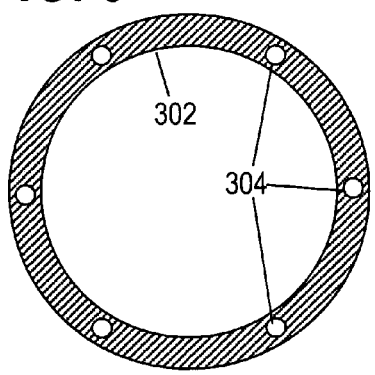
FIG. 3 shows a cross-section of composite tubing with electrical conductors embedded in the wall.

FIG. 2A shows a cross-section of a typical wireline cable having multiple conductors 202. Each of the conductors is surrounded by an insulating jacket 204. The insulated conductors are bundled together by a wrap 205, which in turn is surrounded by two layers of counterwound metal armor wire 206. Being made of metal, the armor wires are conductive and may be used as an eighth conductor. For the sake of convenience, FIG. 2B shows a cross-section of the same wireline cable having its conductors numbered 1-7 and its armor labeled A. This notation will be used in describing the use of transmission modes below. FIG. 3. shows a cross-section of an alternative method to electrically couple downhole sensors to a surface installation: composite tubing 302 with embedded conductors 304. The conductors 304 are preferably equally spaced around the circumference of the tubing, and wound helically along its length.

The multiple conductors in the multi-conductor wireline or in the multi-conductor composite tubing may be used to carry multiple signals. It has been found that despite the significant capacitive coupling on long cable or tubing runs, a high degree of signal isolation may be obtained using orthogonal transmission modes.

Figure 4:
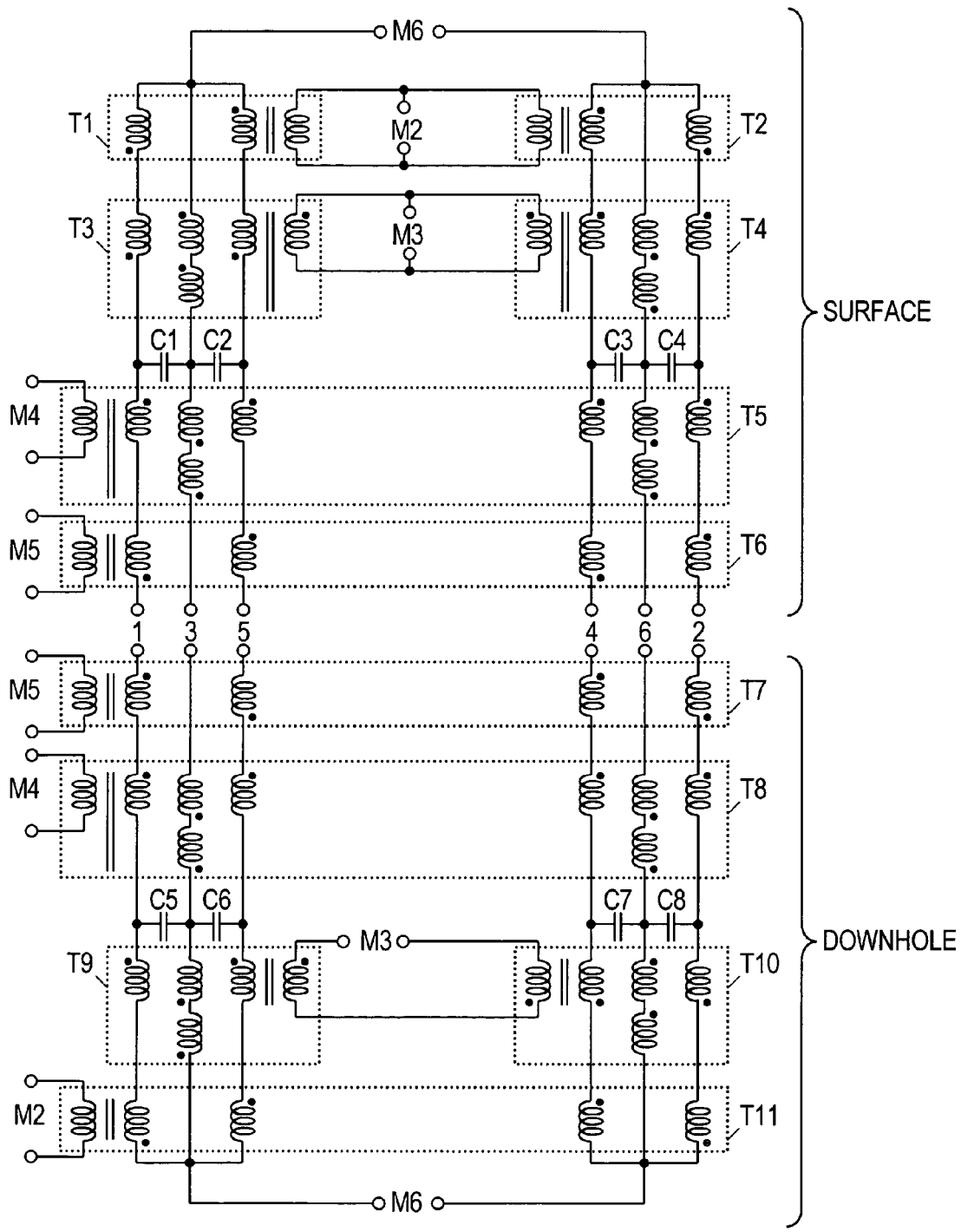
FIG. 4 shows one illustrative embodiment of orthogonal mode transmission and receiving circuitry.

FIG. 4 shows illustrative mode interface circuitry that transforms between multiple two-line signals and corresponding orthogonal transmission modes. The surface interface includes mode transformers T1 through T6, and capacitors C1 through C4. The mode transformers induce voltages on conductors 1-6 of the multiconductor cable in response to voltages supplied to their primary windings. The combination of the imposed conductor voltages forms a transmission mode that is designed to be orthogonal to all other transmission modes. Signals carried via the different transmission modes can be independently received by similarly configured mode transformers T7-T11 in the downhole equipment. The net result is the elimination of signal cross-talk that would otherwise be caused by inductive and capacitive coupling between the conductors.

In one embodiment, power is supplied to terminals M6 for transport downhole via mode M6. To activate mode M6, conductors 1, 3, and 5 are placed at one polarity while the three remaining conductors 2, 4, and 6, are placed at the opposite polarity. Since this is done by direct connection in FIG. 4 (as opposed to transformer coupling used for the other modes), mode M6 can transport both alternating and direct currents. In the contemplated embodiment, the power provided to mode M6 at the surface may be as high as 1300 volts at 3 amps.

Power may also be supplied to terminals M2 for transport downhole. Mode M2 power is excited on conductors 1-6 by driving conductors 1 and 2 with one polarity while driving conductors 4 and 5 with the opposite polarity. In the contemplated embodiment, power transmitted via this mode may be limited to less than 240 watts, with 120 watts delivered to the load at the opposite end of the cable. Power supplied to terminals M3 is impressed by transformer T3 as a potential between conductor 3 and conductors 1 and 5, and by transformer T4 as an equal but opposite potential between conductor 6 and conductors 2 and 4. This excites mode M3 in the cable.

In the contemplated embodiment, transformers T1-T4 are power transformers which have windings with a significant series inductance. This series inductance may effectively form an open circuit to signals transmitters at typical telemetry frequencies. To counteract this effect, the circuit of FIG. 4 has capacitors C1 through C4 to provide closed current paths at typical telemetry frequencies.

Mode transformer T5 operates to transmit and receive telemetry signals. Signals provided to terminals M4 are impressed as a potential between conductor 3 and conductors 1 and 5, and as an equal potential between conductor 6 and conductors 2 and 4. This excites mode M4 in the cable. The voltages at terminals M4 also manifest mode M4 signals transmitted from downhole by mode transformer T8.

Mode transformer T6 similarly operates to transmit and receive telemetry signals. Signals provided to terminals M5 are impressed by driving conductors 1 and 4 with one polarity while driving conductors 2 and 5 with the opposite polarity.

This excites mode M5 in the cable. The voltages at terminals M5 also manifest mode M5 signals transmitted from downhole by mode transformer T7.

In the downhole equipment, mode transformers T7 and T8, with the help of capacitors C5-C8, operate similarly to mode transformers T5 and T6 to send and receive telemetry signals via modes M5 and M4, respectively. Transformers T9 and T10 receive mode M3 power and provide it at terminals M3. Transformer T11 receives mode M2 power and provides it to the terminals marked M2. Mode M6 power is available at terminals M6. Orthogonal modes and the circuit of FIG. 4 are discussed in much greater detail in U.S. Pat. No. 6,469,636, entitled "High-Power Well Logging Method And Apparatus", issued Oct. 22, 2002 to inventors G. Baird, C. Dodge, T. Henderson and F. Velasquez, and hereby incorporated herein by reference.

Figure 5:
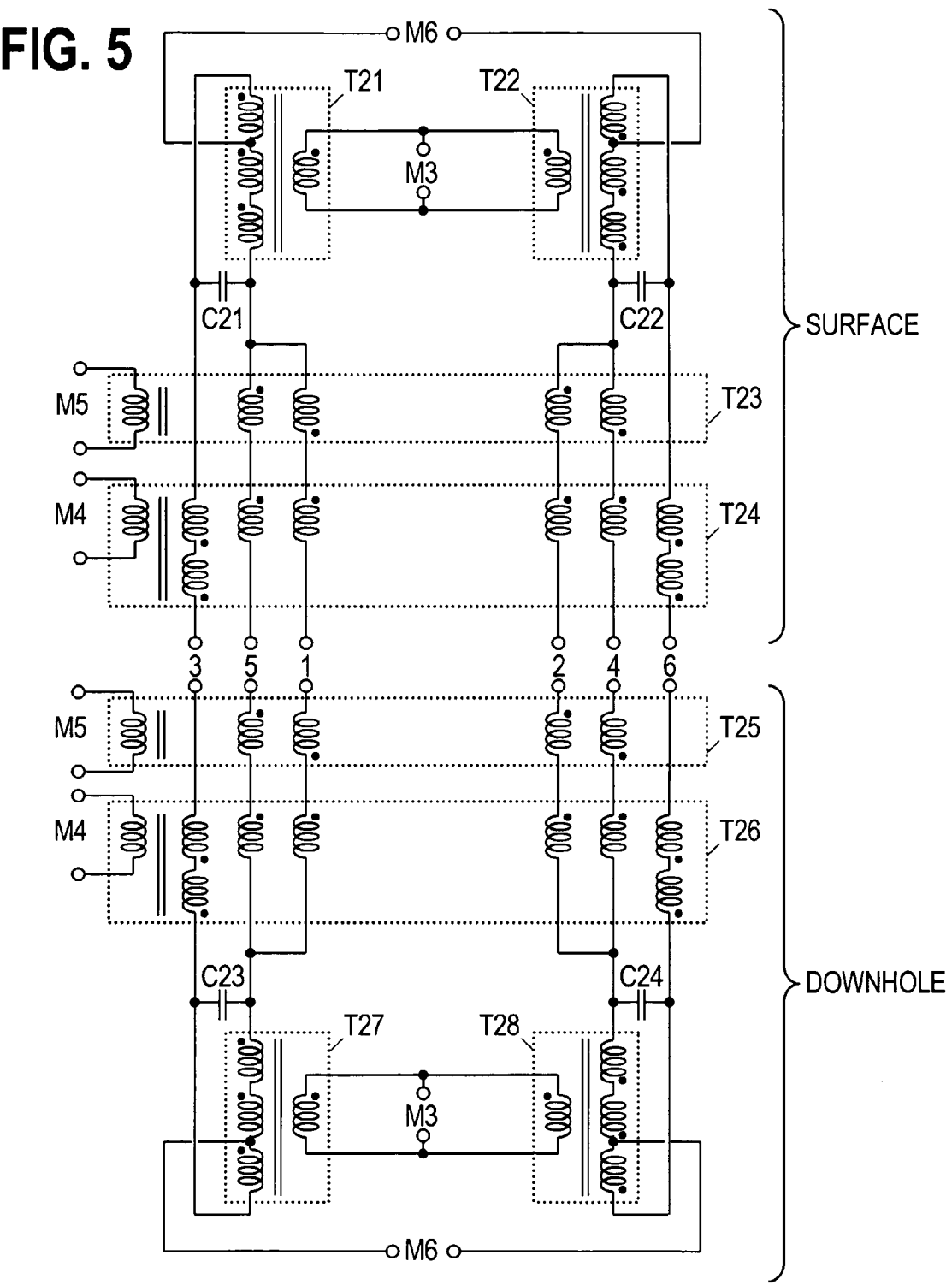
FIG. 5 shows a second illustrative embodiment of orthogonal mode transmission and receiving circuitry.

FIG. 5 shows an alternative embodiment of the mode transform circuitry, having transformers T21-T24 and capacitors C21-C22 in the surface circuitry and transformers T25-T28 and capacitors C23 and C24 in the downhole circuitry. As with the embodiment of FIG. 4, terminals M6 excite mode M6 by direct connection, allowing both alternating and direct current power to be transmitted via mode M6. Transformers T21 and T22 convert between a signal at terminals M3 and transmission mode M3 on conductors 1-6. Capacitors C21 and C22 allow high frequency signals to bypass the windings of transformers T21 and T22. Transformer T23 converts between a signal at terminals M5 and transmission mode M5, while transformer T24 converts between a signal at terminals M4 and transmission mode M4. The downhole components operate similarly to their corresponding surface components.

In both the FIG. 4 and FIG. 5 embodiments, multiple transmission modes are available for telemetry (e.g., modes M4 and M5). One or more modes may be used to carry communication signals between the surface electronics and downhole electronics. In any case, it is desirable to maximize the rate at which information may be reliably conveyed across the communications channel. The modulation scheme selected may be limited by implementation complexity, particularly in the downhole context—a high pressure, high temperature, high vibration environment where space and reliability are at a premium.

One desirable modulation technique for downhole communications is discrete multi-tone (DMT) modulation. DMT modulation is commonly employed in Asymmetrical Digital Subscriber Line (ADSL) systems, so a wealth of detail on DMT implementation is available in the ADSL literature. DMT modulation divides the frequency spectrum into many adjacent sub-channels (see, e.g., FIG. 6). In the ideal case, each frequency sub-channel, or "bin", would have the same data transmission rate as all the other frequency sub-channels. However, the data rate for each bin depends on various factors. For example, interference having a particular frequency may affect certain sub-channels whose frequency is at or near the frequency of the noise source. The affected sub-channels will have lower signal to noise ratios and therefore their data carrying capacity will be lower than other channels. Another factor affecting data rates may be the frequency-dependent attenuation of the cable conductors, which, due to capacitive effects, generally exhibit a smoothly increasing attenuation at higher frequencies. Other system components, such as transformers or imperfect impedance-matching connectors, may further aggravate attenuation at selected frequencies. ADSL systems generally include mechanisms for adjusting the data transmission rate for each sub-channel to optimize the reliable data transmission rate.

Figure 6:
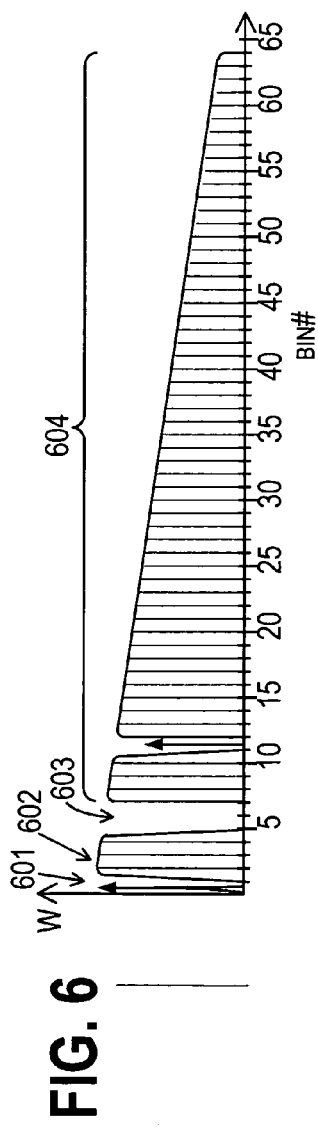
FIG. 6 shows an illustrative bandwidth allocation for discrete multi-tone ("DMT) communications.

FIG. 6 shows an allocation of frequency bins for an illustrative downhole telemetry system having the usable bandwidth divided into 64 equally spaced sub-channels. In the illustrated allocation, sub-channel #0 (indicated by arrow 601) is unused to provide a guard band for power signals. (Some applications may call for 4 KHz power and allowance for harmonics may be desired.) Sub-channels #1-#4 (602) are dedicated for downlink communications. Sub-channels #5-#6 (603) provide a guard band between uplink and downlink communications. Sub-channels #7-#10 and #12-#63 (604) are dedicated to uplink communications. Channel #11 carries a pilot tone. In alternative embodiments, the number of subchannels is 256, similarly divided between uplink and downlink communications.

The allocation scheme illustrated in FIG. 6 is advantageous in that it allows high-rate uplink and downlink communications over a shared transmission mode. However, there are drawbacks that are not apparent. One disadvantage of the FIG. 6 allocation scheme is that the lower-frequency sub-channels are expected to provide higher information transfer rates than higher-frequency sub-channels, typically causing a desirable portion of the channel capacity to be under-utilized. Another disadvantage is the waste of one of these desirable sub-channels on a guard band 603 between uplink and downlink channels. Yet another potential disadvantage is the complexity of the receivers.

These drawbacks are addressed by an illustrative telemetry system embodiment having uplink and downlink communications transported over different transmission modes. The uplink signal may be transported via transmission mode M4, while the downlink signal may be transported via transmission mode M5. In addition, the illustrative embodiment offers downlink modulation scheme that is configurable between DMT and QAM.

Figure 7:
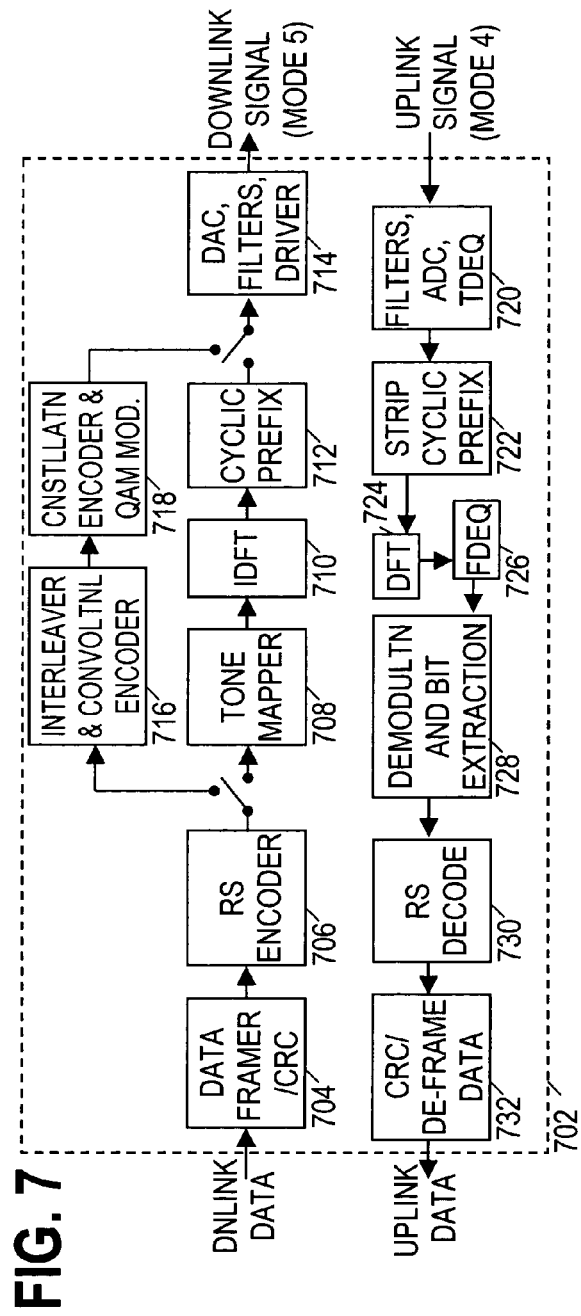
FIG. 7 shows an illustrative surface transmitter/receiver embodiment.

FIG. 7 shows a block diagram of a surface telemetry transmitter/receiver ("transceiver") 702. The transmitter chain includes a data framer 704, an error correction encoder 706, a tone mapper 708, an inverse Discrete Fourier Transform (IDFT) block 710, a cyclic prefix generator 712, a line interface 714, an interleaver and convolutional encoding block 716, and a constellation encoder and QAM modulation block 718. The receiver chain includes a line interface 720, a cyclic prefix stripper 722, a Discrete Fourier Transform (DFT) block 724, a frequency domain equalizer 726, a demodulation and bit extraction block 728, an error correction decoder 730, and a CRC/deframing block 732.

In the transmitter chain, data framer 704 groups bytes of uplink data together to form data frames. The data frames are then grouped together with a synchronization frame and a cyclic redundancy code (CRC) which is calculated from the contents of the data frames. The CRC provides one means for detecting errors in data received at the receiving end. An error correction encoder 706 processes the data frames to add redundancy to the data stream. The redundancy may be used to detect and correct errors caused by channel interference. A Reed-Solomon (RS) code is suitable, but other error correction codes may be used.

Tone mapper 708 takes bits from the data stream and assigns them to frequency bins. For each frequency bin, the bits are used to determine a Discrete Fourier Transform (DFT) coefficient that specifies a frequency amplitude. The number of bits assigned to each frequency bin is variable (i.e., the number may be different for each bin) and dynamic (i.e., the number may change over time), and the number depends on the estimated error rate for each frequency. Microcontrollers or software (not specifically shown) at each end cooperate to determine the error rate detected by the receiver in each frequency band, and to adjust the tone mapper accordingly.

The coefficients provided by the tone mapper 708 are processed by IDFT block 710 to generate a time-domain signal carrying the desired information at each frequency. Cyclic prefix block 712 duplicates the end portion of the time-domain signal and prepends it to the beginning of the time domain signal. As discussed further below, this permits frequency domain equalization of the signal at the receiving end. The signal-with-prefix is then converted into analog form, filtered, and amplified for transmission across the communications channel by line interface 714. Transceiver 702 provides the downlink signal to mode interface circuitry for conversion into mode M5.

Transceiver 702 has a configurable transmit chain that allows blocks 716 and 718 to be substituted for blocks 708-712. When blocks 708-712 are employed, the resulting downlink signal is DMT modulated, whereas the use of blocks 716 and 718 results in a QAM downlink signal.

Block 716 performs interleaving and convolutional encoding on the data stream received from the error correction encoder 706. The interleaving process reorders data stream symbols so as to "spread out" previously adjacent symbols. This prevents an error burst from overcoming the localized error correction ability of the error correction code. Convolutional encoding adds further redundancy to enhance the error resistance of the data stream. Block 718 selects QAM constellation points based on data stream values and modulates the selected constellation points on a carrier frequency. Because QAM does not use multiple carrier frequencies, it may be termed a "single-channel" modulation scheme (as contrasted with the divided-bandwidth operation of DMT modulation). Block 718 provides the QAM signal to line interface 714.

In the receiver chain, line interface 720 filters the received signal, converts it to digital form, and performs any desired time domain equalization. The time domain equalization at least partially compensates for distortion introduced by the channel, but it is likely that at least some intersymbol interference will remain. Stripper block 722 removes the cyclic prefixes that were added by the downhole prefix block (the counterpart of block 716), but trailing intersymbol interference from the cyclic prefix remains in the signal. DFT block 724 performs a DFT on the signal to obtain the frequency coefficients. If desired, frequency domain equalization may be performed by block 726 to compensate for the remaining intersymbol interference. It is noted that frequency domain equalization on DFT coefficients is a cyclic convolution operation which would lead to incorrect equalization results had the cyclic prefix not been transmitted across the channel.

Block 728 extracts the data bits from the frequency coefficients using an inverse mapping of the downhole tone mapper (counterpart to mapper 708). Decoder 730 decodes the data stream correcting such errors as are within its correcting ability. De-framer 732 then identifies and removes synchronization information, and determines if the CRC indicates the presence of any errors. If error free, the data is forwarded to the output. Otherwise, the microcontroller is notified of errors in the data.

Figure 8:
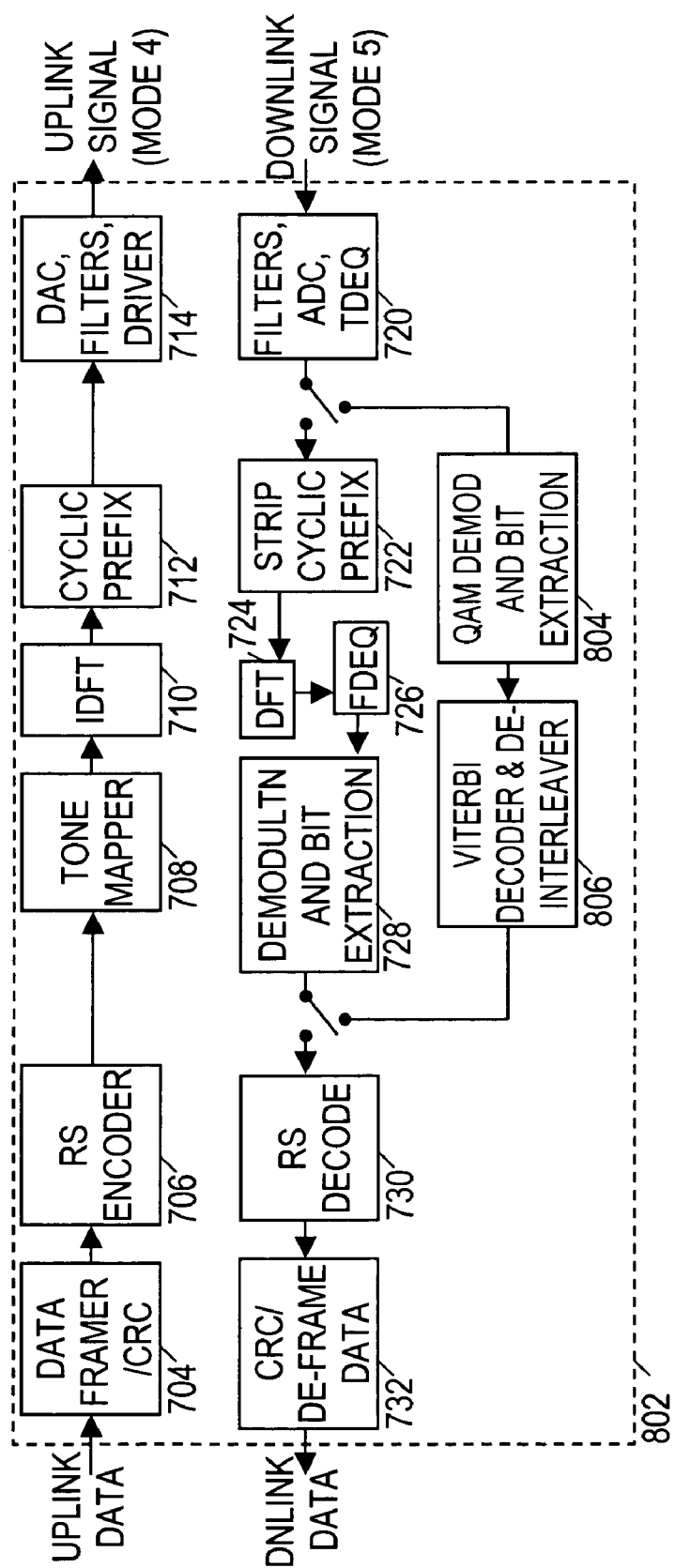
FIG. 8 shows an illustrative downhole transmitter/receiver embodiment.

FIG. 8 shows a block diagram of a downhole telemetry transceiver 802. The transmitter chain includes a data framer 704, an error correction encoder 706, a tone mapper 708, an inverse Discrete Fourier Transform (IDFT) block 710, a cyclic prefix generator 712, and a line interface 714, each of which operates as explained previously. The receiver chain includes a line interface 720, a cyclic prefix stripper 722, a Discrete Fourier Transform (DFT) block 724, a frequency domain equalizer 726, a demodulation and bit extraction block 728, an error correction decoder 730, and a CRC/deframing block 732, which also operate as described previously. In addition, the receiver chain in downhole telemetry transceiver 802 includes a QAM demodulation and bit extraction block 804, and a Viterbi decoder and de-interleaver block 806.

When the surface telemetry transceiver 702 is transmitting a QAM downlink signal, the downhole telemetry transceiver 802 routes the data stream from line interface 720 through blocks 804 and 806 to error correction decoder 730. Block 804 demodulates the QAM downlink signal (i.e., determines the transmitted sequence of QAM constellation points) and determines the bit stream represented by the sequence of constellation points. Block 806 applies the Viterbi decoding method (or some variant thereof) to provide resistance to channel errors. Block 806 also reverses the interleaving operation performed by block 716 in the surface telemetry transceiver 702.

Together, FIGS. 7 and 8 show how telemetry can be conveyed in both directions using different transmission modes. In addition, the downlink signal is configurable between QAM and DMT modulation. The components may be implemented as discrete hardware, or may be implemented as software in a digital processor.

FIG. 9 shows a flow diagram of an illustrative initialization method that may be performed by transceivers 702 and 802. In block 902, both transceivers are powered on, and a handshake phase is performed. The transceivers each transmit single tones to establish contact and determine which one will control the timing of the channel. In block 904, the transceivers individually determine whether the other transceiver has been successfully contacted, and if not, another attempt is made in block 902.

If contact has been established, the transceivers exchange wideband signals in block 906. The wideband signals allow each unit to calculate the received power spectral density, to adjust automatic gain controls, and to perform initial training of the equalizers in each receiver. A quiet period may also be provided to allow each transceiver to determine line noise or to train echo cancellation equalizers. In block 908, the transceivers determine whether training has been successfully completed, and if not, the process is restarted in block 902.

If training is successful, the transceivers exchange information in block 910. The exchanged information includes capabilities of each receiver and proposed data rates. Additional training signals are also sent to permit further equalization training. In block 912, one of the transceivers uses the exchanged information to determine whether a DMT downlink signal can be supported or not, and communicates the determination to the other transceiver. (In various different embodiments that comply with the standard ADSL configuration protocol, the decision may be communicated to the other transceiver at the end of the channel analysis phase, between the channel analysis and exchange phases, or at the beginning of the exchange phase.) In one embodiment, the decision is made by the downhole transceiver based on channel measurements and/or data rates proposed by the surface transceiver. If the available information indicates that a DMT downlink signal would be unreliable or that at the desired data rates the uplink DMT modulation when combined with downlink DMT demodulation would be beyond the hardware performance limits of the downhole transceiver, the downhole transceiver may elect to request a QAM downlink signal.

In block 914, the transceivers may exchange information regarding channel measurements, desired data rates, and other configuration parameters to be used for subsequent communications. The exchanged information regarding the downlink assumes that QAM will be used, while the uplink information assumes DMT modulation will be used. Once the communication parameters have been exchanged, the transceivers enter an ongoing communication mode in block 916. In block 916, the downhole transceiver receives a QAM downlink signal and sends a DMT uplink signal. Operation errors are checked in block 918 to determine whether a re-initiation of the configuration process is required or not.

In block 920, the transceivers may exchange information regarding channel measurements, desired data rates, and other configuration parameters to be used for subsequent communications. The exchanged information regarding both uplink and downlink signals assumes that DMT modulation will be used. Once the communication parameters have been exchanged, the transceivers enter an ongoing communication mode in block 922. In block 922, both transceivers transmit and receive DMT signals. Operation errors are checked in block 924 to determine whether a re-initiation of the configuration process is required or not.

The above discussion is meant to be illustrative of the principles and various embodiments of the present invention. For example, the present invention has been discussed in the context of wireline logging. However, it may also prove advantageous in the context of LWD, particularly in when composite tubing is used. One particular transmission medium may be a long hollow nonconducting pipe with 6 equally spaced electrical conductors embedded within the wall of the flexible pipe. Numerous other variations and modifications will become apparent to those skilled in the art once the above disclosure is fully appreciated. It is intended that the following claims be interpreted to embrace all such variations and modifications.

What is claimed is:

1. A downhole communications system that comprises:
    a downhole transceiver to transmit uplink signals having a fixed modulation method via a first transmission mode, wherein the fixed modulation method is discrete multi-tone (DMT) modulation; and
    a surface transceiver coupled to the downhole transceiver,
    wherein the surface transceiver is configured to transmit a downlink signal to the downhole transceiver via a second transmission mode orthogonal to the first transmission mode,
    wherein the surface transceiver is further configured to transmit a proposed data rate to the downhole transceiver after an initial training phase, and
    wherein the surface transceiver is further configured to receive a downlink modulation method selection from the downhole transceiver in response to the transmission of a proposed data rate, the downlink modulation method being a selectable one of at least two alternative modulation methods including: quadrature amplitude modulation (QAM) without multiple carrier frequencies, and DMT modulation, and wherein the surface transceiver transmits using the selected downlink modulation method.

2. The system of claim 1, further comprising:
    a wired tubing string that couples the downhole transceiver to the surface transceiver.

3. The system of claim 2, wherein the first transmission mode is the M4 transmission mode and the second transmission mode is the M5 transmission mode.

4. The system of claim 1, further comprising:
    a multiconductor cable that couples the downhole transceiver to the surface transceiver.

5. The system of claim 4, wherein the first transmission mode is the M4 transmission mode and the second transmission mode is the M5 transmission mode.

6. The system of claim 1, wherein the downlink modulation method is selected by the downhole transceiver based at least in part on the proposed data rate and the downhole transceiver's measurement of channel noise and power spectral density.

7. The system of claim 6, wherein the downhole transceiver selects QAM as the downlink modulation method if measurements of channel characteristics indicate that a DMT downlink signal would be unreliable.

8. The system of claim 6, wherein the downhole transceiver selects QAM as the downlink modulation method if the proposed data rate exceeds the downhole transceiver's performance limits.

9. A method for use in a downhole communications system, the method comprising:
    using a downhole transmitter to transmit uplink signals having a fixed modulation method to a surface transceiver via a first transmission mode, wherein the fixed modulation method is discrete multi-tone (DMT) modulation;
    measuring channel characteristics including line noise measured during a quiet period, and a power spectral density (PSD) that is determined while receiving a wideband training signal from the surface transceiver via a second transmission mode orthogonal to the first transmission mode;
    receiving information from the surface transceiver that specifies a proposed data rate;
    selecting a downlink modulation technique from a predetermined set of modulation techniques based at least in part on said information and channel characteristics, wherein the predetermined set of modulation techniques includes at least DMT modulation and single-channel QAM; and
    transmitting the selected downlink modulation technique to the surface transceiver for use in communicating a downlink signal from the surface transceiver to the downhole transceiver.

10. The method of claim 9, wherein the selected downlink modulation method is QAM if the measured channel characteristics indicate that a DMT downlink signal would be unreliable.

11. The method of claim 9, wherein the selected downlink modulation method is QAM if the proposed data rate exceeds the downhole transceiver's performance limits.

12. A downhole transceiver that comprises:
    a transmitter chain configured to transmit an uplink signal having a fixed modulation method to a surface transceiver via a first of multiple orthogonal transmission modes, wherein the fixed modulation method is DMT modulation;
    a receiver chain configured to receive from the surface transceiver via a second of said orthogonal transmission modes a selectable one of a) a DMT-modulated signal, and b) a single-channel QAM signal; and
    a microcontroller coupled to the transmitter and receiver chains, wherein the microcontroller is configured to determine channel characteristics including channel noise and power spectral density, and is further configured to respond to a proposed downlink data rate from the surface transceiver by transmitting a downlink modulation selection based at least in part on the channel characteristics and the proposed downlink data rate.

13. The transceiver of claim 12, wherein the microcontroller selects QAM as the downlink modulation if the channel characteristics indicate that a DMT downlink signal would be unreliable.

14. The transceiver of claim 12, wherein the microcontroller selects QAM as the downlink modulation if the proposed data rate exceeds a performance limit of the downhole transceiver.

15. The transceiver of claim 12, wherein the first transmission mode is the M4 transmission mode and the second transmission mode is the M5 transmission mode.

* * * * *